United States Patent Office 3,639,444
Patented Feb. 1, 1972

3,639,444
NITRO ALKYL-N-PHENYL CARBAMATES
Richard Wessendorf, Hilden, Rhineland, Heinz Günter Nösler, Monheim, Rhineland, and Horst Bellinger, Dusseldorf, Germany, assignors to Henkel & Cie GmbH, Dusseldorf-Holthausen, Germany
No Drawing. Original application July 25, 1968, Ser. No. 747,453. Divided and this application Feb. 3, 1970, Ser. No. 12,513
Claims priority, application Germany, July 25, 1967, H 63,380
Int. Cl. C07c 125/06
U.S. Cl. 260—472
10 Claims

ABSTRACT OF THE DISCLOSURE

Compositions and method for killing bacteria and fungi having as the active ingredient a nitro alkyl-N-phenyl carbamate and to novel bromo-nitroalkyl - N - phenylcarbamates.

The present application is based upon the disclosure of German convention application Ser. No. H63,380, filed July 25, 1967, the priority of which is hereby claimed.

This application is a division of U.S. application Ser. No. 747,453, filed July 25, 1968.

STATE OF THE ART

Many organic nitro compounds are known to possess antibacterial properties and examples of such compounds are aromatic nitro compounds, nitro-substituted pyridine derivatives, nitrofurfuran derivatives, many aliphatic nitro, di-nitro and polynitro compounds. Of particular interest as preservatives have been aliphatic nitro alcohols and brominated derivatives thereof due to their broad spectrum of activity. These compounds, however, have the disadvantage of showing signs of decomposition after storage under atmospheric conditions for a short time and they generally have only a low degree of activity which is disadvantageous for impregnating wood and textiles for instance.

Known fungicides include nitro alcohols and esters of nitro alcohols with mono- and polybasic carboxylic acids but these products are only effective against fungi and not against bacteria. Therefore, their limited spectrum is too restricted for general use as antimicrobic agents. Up to now, there has been no reliable known connection between chemical structure and antimicrobic activity. For example, Urbanski in "Nitro Compounds," Warsaw, 1964, p. 449 et seq., discloses that ethyl 4-chloro-4,4-dinitro butyrate and 2-bromo-2-nitro-propanediol-1(1,3) have a high activity against micro-organisms while ethyl 4-bromo-4,4-dinitro butyrate and 2-chloro-2-nitro-propanediol-(1,3) are substantially devoid of any such activity.

OBJECTS OF THE INVENTION

It is an object of the invention to provide novel bromo-nitroalkyl-N-phenylcarbamates.

It is an additional object of the invention to provide novel anti-microbic compositions having a nitroalkyl-N-phenylcarbamate as the active ingredient.

It is a further object of the invention to provide synergistic anti-microbic compositions.

It is another object of the invention to provide improved methods for killing bacteria and fungi.

These and other objects and advantages of the invention will become obvious from the following detailed description.

THE INVENTION

The novel anti-microbic compositions of the invention are comprised of an effective amount of a nitroalkyl-N-phenylcarbamates of the formula

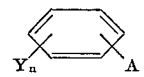

(I)

wherein Y is selected from the group consisting of chlorine and nitro, $n$ is a whole number from 0 to 2, A is a carbamic acid ester group of the formula

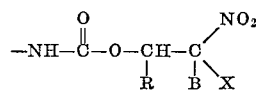

wherein R is selected from the group consisting of hydrogen and methyl, X is selected from the group consisting of hydrogen and bromine and B is selected from the group consisting of hydrogen, methyl, ethyl and a phenylcarbamic acid group of the formula

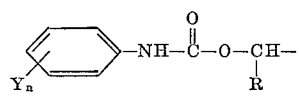

wherein Y, $n$ and R have the above definitions and a major amount of an inert carrier.

All the nitroalkyl-N-phenylcarbamates of Formula I possess bactericidal and fungicidal activity and are useful in anti-microbic compositions. Particularly preferred are the compounds of Formula I wherein X is bromine which are novel compounds as they have a particularly high degree of activity and are effective microbicides at low concentrations. The compounds of Formula I have the advantages of strong fungicidal activity, excellent activity against gram-positive and gram-negative bacteria, no tendency to decompose and high degree of activity for impregnation.

Examples of specific nitroalkyl-N-phenylcarbamates of Formula I are:

2-nitroethyl-N-phenylcarbamate
2-nitroethyl-N-(3-chlorophenyl)-carbamate
2-nitroethyl-N-(3-,4-dichlorophenyl)-carbamate
2-nitroethyl-N-(4-nitrophenyl)-carbamate
1-methyl-2-nitroethyl-N-(3,4-dichlorophenyl)-carbamate
2-nitropropyl-N-phenylcarbamate
2-nitropropyl-N-(3-chlorophenyl)-carbamate
2-nitrobutyl-N-phenylcarbamate
1-methyl-2-nitropropyl-N-phenylcarbamate
1-methyl-2-nitrobutyl-N-(4-nitrophenyl)-carbamate
2-bromo-2-nitroethyl-N-(3-chlorophenyl)-carbamate
1-methyl-2-bromo-2-nitroethyl-N-phenylcarbamate
2-bromo-2-nitropropyl-N-(3-chlorophenyl)-carbamate
2-bromo-2-nitrobutyl-N-phenylcarbamate
2-bromo-2-nitrobutyl-N-(3,4-dichlorophenyl)-carbamate
1-methyl-2-bromo-2-nitropropyl-N-(4-nitrophenyl)-carbamate
1-methyl-2-bromo-2-nitrobutyl-N-phenylcarbamate
2-nitropropanediol-(1,3)-bis-N-phenylcarbamate
2-nitropropanediol-(1,3)-bis-N-(3,4-dichlorophenyl)-carbamate
1-methyl-2-nitropropanediol-(1,3)-bis-N-(3-chlorophenyl)-carbamate
1,3-dimethyl-2-nitropropanediol-(1,3)bis-N-(4-nitrophenyl)-carbamate
2-bromo-2-nitropropanediol-(1,3)-bis-N-phenylcarbamate
2-bromo-2-nitropropanediol-(1,3)-bis-N-(3-chlorophenyl)-carbamate 2-bromo-2-nitropropanediol-(1,3)-bis-N-(3,4-dichlorophenyl)-carbamate
2-bromo-2-nitropropanediol-(1,3)-bis-N-(4-nitrophenyl)-carbamate
1-methyl-2-bromo-2-nitropropanediol-(1,3)-bis-N-(3-chlorophenyl)-carbamate
1,3-dimethyl-2-bromo-nitropropanediol-(1,3)-bis-N-(3,4-di-chlorophenyl)-carbamate.

The antimicrobic composition of the invention may be in the form of liquid, pasty or solid preparations such as aqueous suspensions, emulsions, solutions in organic solvents, oils, ointments, creams, pencils, powders, soaps, toothpastes and mouthwashes which may be used as cleansing agents, general and special skin treatment agents and other cosmetic compositions. The compositions usually contain 0.05 to 5% by weight, preferably 0.1 to 1% by weight of the said nitro-alkyl-N-phenylcarbamate.

In a modification of the antimicrobic compositions of the invention, synergistic compositions are comprised of an effective amount of a complexing agent having a calcium carbonate binding capacity greater than 230 mg. per gm. of complexing agent in the Hampshire test and at least one nitro-alkyl-N-phenylcarbamate of Formula I in a weight ratio of carbamate to complexing agent of 1:1000 to 50:1, depending upon the specific components.

The complexing agent in the compositions of the invention having a calcium carbonate binding capacity of more than 230 mg. in the Hampshire test may belong to varied classes of compounds such as polycarboxylic acids, hydroxy carboxylic acid, aminocarboxylic acids, phosphonic acids and polyphosphonic acids and their alkali metal salts. The Hampshire method for determining calcium carbonate binding capacity is described in the publication of the Hampshire Chemical Corporation of June 1960, "Hampshire NTA Technical Bulletin," appendix, page A2. In the method, exactly 2 gm. of a powdery complexing agent are dissolved in 50 cc. of distilled water after which the solution is neutralized and admixed with 10 ml. of a 2% sodium carbonate solution. The pH is adjusted to 11-12 and the solution is diluted to 100 ml. Then the solution is titrated with a calcium acetate solution containing 44.1 gm. of calcium acetate monohydrate per liter until a distinct and lasting turbidity occurs. The calcium carbonate-binding capacity is determined according to the formula:

$$\frac{\text{cc. calcium acetate solution} \times 25}{\text{weight portion of complexing agent}} = \text{mg. calcium carbonate bound per gm. of complexing agent}$$

In the following examples are described several preferred embodiments to illustrate the invention. However, it should be understood that the invention is not intended to be limited to the specific embodiment.

EXAMPLE I 0.1 mole of 2-nitroethanol was admixed with 0.12 mole of phenylisocyanate in anhydrous benzene and the mixture was heated at reflux for 4 to 5 hours. After distilling off the majority of the benzene, the residue was recrystallized from a 1:1 mixture of petroleum ether and benzene to obtain 2-nitroethyl-N-phenylcarbamate (agent A) having a melting point of 103° C.

Using the same procedure, the compounds of Table A were prepared from the appropriate alcohol and phenylisocyanate.

TABLE A

| Agent | Compound | Melting point in ° C. |
|---|---|---|
| B | 2-nitropropyl-N-phenylcarbamate | 102 |
| C | 1-methyl-2-nitropropyl-N-phenylcarbamate | 93 |
| D | 2-nitropropyl-N-(3-chlorophenyl)-carbamate | 88 |
| E | 2-nitrobutyl-N-phenylcarbamate | 72 |
| F | 2-bromo-2-nitroethyl-N-(3-chlorophenyl)-carbamate | 105 |
| G | 2-bromo-2-nitropropyl-N-(4-nitrophenyl)-carbamate | |
| H | 2-bromo-2-nitrobutyl-N-phenylcarbamate | 87 |
| I | 2-bromo-2-nitrobutyl-N-(3,4-dichlorophenyl)-carbamate | 79 |
| K | 1-methyl-2-bromo-2-nitropropyl-N-(3-chlorophenyl)-carbamate | 94-95 |
| L | 2-nitropropanediol-(1,3)-bis-N-phenylcarbamate | 115 |
| M | 2-bromo-2-nitropropanediol-(1,3)-bis-N-phenylcarbamate | 126 |
| N | 2-bromo-2-nitropropanediol-(1,3)-bis-N-(3-chlorophenyl)-carbamate | 123 |
| O | 2-bromo-2-nitropropanediol-(1,3)-bis-N-(3,4-dichlorophenyl)-carbamate | 124 |
| P | 2-bromo-2-nitropropanediol-(1,3)-bis-N-(4-nitrophenyl)-carbamate | |

The desired test concentrations were prepared by mixing specific amount of the substance solutions of suitable concentrations with specific amounts of liquid bouillon or beer wort-agars, in sterile petri-dishes. The amounts, measured with a pipette, of the substance solutions were a maximum of 0.1 to 1 ml. and the total volume in the petri-dishes after admixing with the culture media amounted to 10 ml. After solidification of the culture media, its surface was inoculated with the test germ suspension in bouillon or wort, which contained about $10^8$ grams per ml. The incubation took place at 37° C. or at 30° C. in the incubator, and lasted 8 days when bacteria or Candida albicans were employed. When epidermophyton Kaufmann-Wolf were used, it lasted 21 days. The duration of incubation of 21 days for epidermophyton Kaufmann-Wolf was chosen to conform to the above standard test, because in the evaluation of disinfectants against fungi of the epithelium a substance is considered as suitable when the growth of the fungi after predetermined duration of action is delayed by at least 21 days. Therefore, it was ascertained which of the substance concentrations worked into the culture media was just about capable to arrest the growth of the test germs completely. This value thus ascertained was indicated as threshold concentration. The tests were carried out in the following concentration intervals: 10,000; 5,000; 2,500; 1,000; 750; 500; 250; 100; 50; 25; 10; 5; 2.5; 1; 0.5; 0.25 and 0.1 p.p.m.

TABLE I

| | | Test germs | | | | |
|---|---|---|---|---|---|---|
| Agent | Concentration in p.p.m. | Staphylococcus aureus | Escherichia coli | Pseudomonas aeruginosa | Candida albicans | Epidermophyton Kaufmann-Wolf |
| A | 250 | − | − | − | − | − |
|   | 100 | − | − | − | − | − |
|   | 50 | + | + | + | + | − |
|   | 25 | + | + | + | + | − |
|   | 10 |   |   |   |   | − |
|   | 5 |   |   |   |   | + |
| B | 250 | − | − | − | − | − |
|   | 100 | − | − | − | + | − |
|   | 50 | + | + | + | + | − |
|   | 25 | + | + | + | + | − |
|   | 10 |   |   |   |   | − |
|   | 5 |   |   |   |   | + |
| C | 1,000 | − | − | − | − | − |
|   | 500 | − | − | − | + | − |
|   | 250 | − | − | + | + | − |
|   | 100 | + | + | + | + | − |
|   | 50 | + | + | + | + | − |
|   | 25 |   |   |   |   | − |
|   | 10 |   |   |   |   | + |
|   | 5 |   |   |   |   | + |

| Agent | Concentration in p.p.m. | Staphylococcus aureus | Escherichia coli | Pseudomonas aeruginosa | Candida albicans | Epidermophytn Kaufmann-Wolf |
|---|---|---|---|---|---|---|
| D | 500 | − | − | − | + | − |
|   | 250 | − | − | − | − | − |
|   | 100 | + | + | + | + | − |
|   | 50  | + | + | + |   | − |
|   | 25  |   |   |   |   | − |
|   | 10  |   |   |   |   | − |
|   | 5   |   |   |   |   | − |
|   | 2.5 |   |   |   |   | − |
|   | 1   |   |   |   |   | − |
|   | 0.5 |   |   |   |   | + |
| E | 500 | − | − | − | − | − |
|   | 250 | − | − | − | − | − |
|   | 100 | − | − | − | + | − |
|   | 50  | + | + | + | + | − |
|   | 25  | + | + | − | − | − |
|   | 10  |   |   |   |   | − |
|   | 5   |   |   |   |   | + |
| F | 500 | − | − | − |   | − |
|   | 250 | − | − | − |   | − |
|   | 100 | − | − | + |   | − |
|   | 50  | − | − | + |   | − |
|   | 25  | + | + |   | − | − |
|   | 10  | + | + |   | − | − |
|   | 5   |   |   |   | + | − |
|   | 2.5 |   |   |   | − |   |
|   | 1   |   |   |   |   | + |
|   | 0.5 |   |   |   |   | + |
| G | 500 | − | − | − |   | − |
|   | 250 | − | − | − |   | − |
|   | 100 | − | − | + |   | − |
|   | 50  | + | + | + | − | − |
|   | 25  | + | + |   | − | − |
|   | 10  |   |   |   | + | − |
|   | 5   |   |   |   | + | − |
|   | 2.5 |   |   |   |   | + |
|   | 1   |   |   |   |   | + |
|   | 0.5 |   |   |   |   | + |
| H | 500 | − | − | − |   | − |
|   | 250 | − | − | + |   | − |
|   | 100 | − | − | + |   | − |
|   | 50  | + | + |   | − | − |
|   | 25  | + | + |   | − | − |
|   | 10  |   |   |   |   | − |
|   | 5   |   |   |   | + | − |
|   | 2.5 |   |   |   | + | − |
|   | 1   |   |   |   |   | + |
| I | 500 | − | − | − |   | − |
|   | 250 | − | − | + |   | − |
|   | 100 | − | − | + |   | − |
|   | 50  | − | + |   | − | − |
|   | 25  | − | + |   | − | − |
|   | 10  | − |   |   | − | − |
|   | 5   | + |   |   | − | − |
|   | 2.5 | + |   |   | + | − |
|   | 1   |   |   |   | − | − |
|   | 0.5 |   |   |   |   | + |
| K | 500 | − | − | − |   | − |
|   | 250 | − | − | − |   | − |
|   | 100 | − | − | + |   | − |
|   | 50  | − | − | + |   | − |
|   | 25  | + | + |   | − | − |
|   | 10  | + | + |   | − | − |
|   | 5   |   |   |   | + | − |
|   | 2.5 |   |   |   | + | − |
|   | 1   |   |   |   |   | + |
|   | 0.5 |   |   |   |   | + |
| L | 500 | − | − | − | − | − |
|   | 250 | − | − | − | − | − |
|   | 100 | − | − | + | + | − |
|   | 50  | + | + | + | + | − |
|   | 25  | + | + |   |   | − |
|   | 10  |   |   |   |   | − |
|   | 5   |   |   |   |   | + |
| M | 500 | − | − | − |   | − |
|   | 250 | − | − | − |   | − |
|   | 100 | − | − | − |   | − |
|   | 50  | + | + | + | − | − |
|   | 25  | + | + | + | − | − |
|   | 10  |   |   |   | + | − |
|   | 5   |   |   |   | + | − |
|   | 2.5 |   |   |   |   | − |
|   | 1   |   |   |   |   | + |
| N | 500 | − | − | − |   | − |
|   | 250 | − | − | − |   | − |
|   | 100 | − | − | − |   | − |
|   | 50  | + | + | + | − | − |
|   | 25  | + | + | + | + | − |
|   | 10  |   |   |   | + | − |
|   | 5   |   |   |   |   | + |
| O | 500 | − | − | − | − | − |
|   | 250 | − | + | − | − | − |
|   | 100 | − | + | + | − | − |
|   | 50  | + |   | + | − | − |
|   | 25  | − |   |   | + | − |
|   | 10  | + |   |   | + | − |
|   | 5   | + |   |   |   | + |
| P | 500 | − | − | − |   | − |
|   | 250 | − | − | − |   | − |
|   | 100 | − | − | + |   | − |
|   | 50  | + | + | + | − | − |
|   | 25  | + | + |   | + | − |
|   | 10  |   |   |   | + | − |
|   | 5   |   |   |   |   | + |

NOTE.—− = No growth; + = growth.

EXAMPLE II

The fungicidal activity of 2-nitropropyl-N-phenyl-carbamate (B) and 2-nitropropyl-N-(3-chlorophenyl)-carbamate (D) in the gaseous phase was shown by the following procedure. The compounds were dissolved in acetone and then applied to round filter paper, after which the acetone was evaporated off at 20° C. The said filter paper was placed in the cover of a Petri-dish (90 mm. diameter) and the lower part was filled with agar which was surface inoculated with the germs of Table II.

An intermediate space of about 5 to 6 mm. in width existed between the filter paper and the surface of the nutrient medium. The dishes were then incubated at 30° C. for up to 4 weeks and evaluated. The numerical values given in Table II relate to the amounts of active substance in mg. required on the filter paper which was just sufficient for a complete inhibition growth of the germs.

cans were employed. When Epidermophyton Kaufmann-Wolf was used, it lasted 21 days. The duration of incubation of 21 days for Epidermophyton Kaufmann-Wolf was chosen to conform to the above standard test, because in the evaluation of disinfectants against fungi of the epithelium a substance is considered as suitable when the growth of the fungi after predetermined duration of action is delayed by at least 21 days. Therefore, it was ascertained which of the substance concentrations worked into the culture media was just about capable to arrest the growth of the test germs completely. The tests were carried out in the various concentrations of carbamates and with 1000 p.p.m. of the complexing agent. The complexing agents alone had no inhibiting activity on the growth of the micro-organisms. The results of the tests are shown in Tables IV to VII.

TABLE II.—SUPPRESSION OF THE GROWTH OF SOME FUNGI FROM THE GASEOUS PHASE

| Agent | Asp. niger | Asp. tamarii | Asp. flavus | Cladosporium sp. | richoderma viride | Pencamerunense | Epidermophyton | Triphyton rubyum |
|---|---|---|---|---|---|---|---|---|
| B | 5 | 2.5 | 2.5 | 2.5 | 25 | 25 | 5 | 2.5 |
| D | 50 | 50 | 25 | 25 | 2.5 | 2.5 | 2.5 | 2.5 |

EXAMPLE III

Examples of complexing agents having a calcium carbonate binding capacity of more than 230 mg. per gm. of complexing agent are shown in Table III.

TABLE III

| Complexing agent | | Mg. of calcium carbonate bound by 1 gm. of agent |
|---|---|---|
| K-1 | 1-hydroxyhexane-1,1-diphosphonic acid | 280 |
| K-2 | α-Aminoethane-α,α-diphosphonic acid | 930 |
| K-3 | α-aminobenzyl-α,α-diphosphonic acid | 1,460 |
| | Aminotrimethylenephosphonic acid (Dequest 2000) | 820 |
| | Ethylenediamine tetramethylenephosphonic acid | 860 |
| | Aminodimethylenephosphonic acid N-acetic acid | 850 |
| | Iminodiacetic acid-N-methylenephosphonic acid | 540 |
| | Hydroxyethanediphosphonic acid | 810 |
| | Phosphonic acetic acid | 270 |
| | Citric acid | 328 |
| K-4 | Diethylenetriaminopenta acetic acid (DTPA) | 275 |
| K-5 | 1,2-cyclohexanediamine-tetra acetic acid (CDTA) | 285 |
| K-6 | Ethylenediamino-tetra acetic acid (EDTA) | 402 |
| K-7 | Nitrilotriacetic cid (NTA) | 578 |
| K-8 | | 250 |

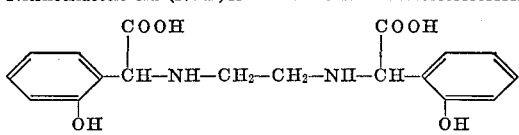

Chel DP (R)

The threshold concentrations of the nitroalkyl-N-phenylcarbamates of Table A and combinations thereof with complexing agents of Table III were determined by the so-called plate test. This variation of the dilution test for chemical disinfectants set up by Deutsche Gesellschaft für Hygene und Mikrobiologie has the advantage of using a solid culture media instead of a liquid culture media. Solid culture media have the advantage of being able to easily discern the effectiveness, particularly for fungicides.

The desired test concentrations were prepared by mixing specific amounts of the substance solutions of suitable concentrations with specific amounts of liquid bouillon or beer-wort agars, in sterile Petri-dishes. The amounts, measured with a pipette, of the substance solutions were a maximum of 0.1 to 1 ml. and the total volume in the Petri-dishes after admixing with the culture media amounted to 10 ml.

After solidification of the culture media, its surface was inoculated with the test germ suspension in bouillon or wort, which contained about $10^8$ germs per ml. The incubation took place at 37° C. or at 30° C. in the incubator, and lasted 8 days when bacteria Candida albi- In Tables IV to VII, the designations for the column headings are as follows:

1 = Antimicrobic agent
2 = Inhibiting concentration in p.p.m.
3 = Complex-forming concentration of compound used always 1000 p.p.m.
4 = Inhibiting concentration of the anti-microbial substance with simultaneous insertion of 1000 p.p.m. of complex forming compound

TABLE IV

Staphylococcus aurous

| 1 | 2 | 3 | 4 | 5 |
|---|---|---|---|---|
| A | 100 | K-4 | 25 | 4 |
| B | 100 | K-7 | 25 | 4 |
| C | 250 | K-4 | 50 | 5 |
| D | 250 | K-2 | 10 | 25 |
| D | 250 | K-3 | 25 | 10 |
| D | 250 | K-7 | 50 | 5 |
| E | 100 | K-6 | 50 | 2 |
| F | 50 | K-2 | 5 | 10 |
| G | 100 | K-5 | 25 | 4 |
| H | 100 | K-5 | 25 | 4 |
| I | 10 | K-2 | 1 | 10 |
| K | 50 | K-4 | 10 | 5 |
| L | 100 | K-3 | 25 | 4 |
| M | 100 | K-4 | 25 | 4 |
| N | 100 | K-5 | 25 | 4 |
| O | 25 | K-4 | 10 | 2.5 |
| P | 100 | K-7 | 25 | 4 |

TABLE V

*Escherichia coli*

| 1 | 2 | 3 | 4 | 5 |
|---|---|---|---|---|
| B | 100 | K-7 | 25 | 4 |
| B | 100 | K-4 | 10 | 10 |
| C | 250 | K-1 | 50 | 5 |
| C | 250 | K-7 | 50 | 5 |
| D | 250 | K-4 | 100 | 2.5 |
| D | 250 | K-8 | 100 | 2.5 |
| H | 100 | K-1 | 10 | 10 |
| H | 100 | K-4 | 25 | 4 |
| H | 100 | K-7 | 25 | 4 |
| I | 100 | K-6 | 25 | 4 |
| M | 100 | K-4 | 10 | 10 |
| N | 100 | K-8 | 25 | 4 |

TABLE VI

*Candida albicans*

| 1 | 2 | 3 | 4 | 5 |
|---|---|---|---|---|
| B | 250 | K-8 | 50 | 5 |
| D | 500 | K-4 | 100 | 5 |
| I | 5 | K-4 | 1 | 5 |
| M | 25 | K-4 | 5 | 5 |
| N | 50 | K-8 | 10 | 5 |

TABLE VII

*Epidermophyton Kaufmann-Wolf*

| 1 | 2 | 3 | 4 | 5 |
|---|---|---|---|---|
| B | 10 | K-3 | 1 | 10 |
| D | 1 | K-5 | 0.25 | 4 |
| H | 2.5 | K-5 | 1 | 2.5 |
| I | 1 | K-3 | 0.1 | 10 |
| M | 2.5 | K-6 | 0.25 | 10 |
| O | 10 | K-7 | 2.5 | 4 |

Tables IV to VII clearly demonstrate the synergistic activity of the compositions of the invention as compared to the phenylcarbamate alone or the complexing agent alone. The complexing agents listed in Table VIII have a calcium carbonate binding capacity below 230 mg. per gm. in the Hampshire test and when used in combination with the nitro alcohols in the test there was no increase in antimicrobic activity.

TABLE VIII

| Complexing agent: | Mg. of calcium carbonate per gm. of complexing agent |
|---|---|
| Hydroxymethylphosphonic acid | 1 |
| Mexoxalic acid monohydrate | 6 |
| 1-cysteinhydrochloride monohydrate | 14 |
| Glycolic acid | 45 |
| Tetra sodium pyrophosphate | 125 |
| n-Hexylaminodimethylenephosphonic acid | 160 |
| Sodium tripolyphosphate | 214 |
| Hexamethylenediamino-tetramethylene phosphonic acid | 220 |

(A) Antimicrobial solution: Parts by wt.
  2-bromo-2-nitrobutyl-N-(3,4-dichlorophenyl)-carbamate _____ 3.0
  Spirit dil. _____ ad 50

(B) Antimicrobial salves:
  (1)
  2-bromo-2-nitroethyl-N-(3-chlorophenyl)-carbamate _____ 3.0
  Vaseline alba _____ ad 100
  (2)
  2-bromo-2-nitropropanidial-(1,3)-bis-N-(3,4-dichlorophenyl)-carbamate _____ 3.0
  Ungetum alcohol. lanae _____ ad 100
  (3)
  2-bromo-2-nitropropyl-N-(4-nitrophenyl)-carbamate _____ 3.0
  Polyethylenglycol 300 and polyethylenglycol 1500 1:1 _____ ad 100
  (4)
  2-bromo-2-nitropropandiol-(1,3)-bis-N-(3-chlorophenyl)-carbamate _____ 3.0
  Oleic acid decyl ester _____ 16.0
  Colloid dispersive mixture of 90 parts of $C_{16}$–$C_{18}$-alcohol and 10 parts of sodium fatty alcohol sulfate of 16 to 18 carbon atoms _____ 24.0
  Water _____ 57.0

(C) Antimicrobial powder:
  2-bromo-2-nitorbutyl-N-(3,4-dichlorophenyl)-carbamate _____ 3.0

(D) Day cream and lotion:
  1-methyl-2-bromo-2-nitropropyl-N-(3-chlorophenyl)-carbamate _____ 1.0
  Decyl ester of oleic acid _____ 10.0
  Vegetable oil _____ 10.0
  28° Bé glycerin _____ 4.0
  Colloid dispersive mixture of 90 parts $C_{16}$–$C_{18}$-alcohol and 10 parts of sodium laurylsulfate _____ 15.0
  Water _____ 60.0

(E) Clear shampoo:
  2-bromo-2-nitrobutyl-N-carbamate _____ 1.0
  Sodium lauryl ether sulfate (27–28% WAS) _____ 40.0
  Diethanolamide of coconut fatty acid _____ 6.0
  Water _____ 53.0

(F) Emulsion shampoo:
  2-bromo-2-nitropropanediol-(1,3)-bis-N-phenyl-carbamate _____ 1.0
  Sodium lauryl sulfate (90% WAS) _____ 10.0
  Diethanolamide of coconut fatty acid _____ 3.0
  Ethyleneglycol stearate _____ 2.0
  Sodium chloride _____ 1.0
  Water _____ 83.0

(G) Shampoo with egg yolk:
  2-bromo-2-nitro-propanediol-(1,3)-bis-N-(4-nitrophenyl)carbamate _____ 1.0
  Fatty alcohol sulfate of 16 to 18 carbon atoms (40% WAS) _____ 44.0
  Technical liquid egg yolk _____ 2.0
  Sodium chloride _____ 0.3
  Water _____ 52.7

(H) Bubble bath:
  2-bromo-2-nitrobutyl-N-(3,4-dichlorophenyl)-carbamate _____ 1.0
  Sodium lauryl ether sulfate (27–28% WAS) _____ 69.0
  Diethanolamide of coconut fatty acid _____ 5.0
  Water _____ 25.0

(I) Disinfectant hand wash paste:
  Sodium lauryl sulfate _____ 45
  Monoethanolamide of coconut fatty acid _____ 3
  Finely ground pumice _____ 41
  2-bromo-2-nitrobutyl-N-(3,4-dichlorophenyl)-carbamate _____ 1
  Disodium salt of nitrilotriacetate acid _____ 10

(J) Antimicrobial scouring agent:
  Dodecylbenzene sulfonate (WAS 30%) _____ 20
  Sodium sulfate _____ 2
  Disodium salt of nitrilotriacetic acid _____ 10
  2-bromo-2-nitrobutyl-N-phenyl-carbamate _____ 1
  Finely ground pumice _____ 5
  Finely ground quartz powder _____ 62
  Perfume _____ —

(K) Antimicrobial fine detergents: Parts by wt.
  Dodecylbenzene sulfonate _____ 24
  Toluenesulfonate _____ 1.5
  Sodium coconut fatty alcohol sulfate _____ 5
  Sodium sulfate _____ 25
  Sodium carboxymethyl cellulose _____ 1
  2-bromo-2-nitropropanediol-(1,3)-N-(3,4-dichlorophenyl)-carbamate _____ 1
  Disodium salt of nitrilotriacetic acid _____ 30
  Water _____ 12.5

TABLE VIII—Continued

| Complexing agent: | Mg. of calcium carbonate per gm. of complexing agent |
|---|---|
| (L) Disinfectants for equipment and instruments: | |
| α-Aminoethane-α,α-diphosphonic acid | 99 |
| 2 - bromo - 2-nitrobutyl-N-(3,4-dichlorophenyl)-carbamate | 1 |
| (M) Clear antiseptic shampoo: | |
| Sodium lauryl ether sulfate (27–28% WAS) | 40 |
| Diethanolamide of coconut fatty acid | 6 |
| 2-bromo-2-nitroethyl-N-(3-chlorophenyl) | 1 |
| Sodium salt of ethylendiaminetetracetic acid | 3 |
| Water | 50 |
| (N) Bubble bath with antimicrobial effect: | |
| Sodium lauryl ether sulfate (27–28% WAS) | 65 |
| Diethanolamide of coconut fatty acid | 5 |
| 2 - bromo - 2 - nitropropanediol - (1,3)-bis-N-(3-chlorophenyl)-carbamate | 1 |
| Sodium salt of ethylenediaminetetracetic acid | 3 |
| Water | 26 |

The advantage obtained by the invention resides in the fact that the compositions guarantee full protection both towards gram positive and gram negative bacteria and towards fungi due to the strong effect of its active substance. This good effect of the agent per se can be still greatly increased through a combination with complex formers which in the Hampshire test according to the calcium carbonate method possess a calcium carbonate binding capability greater than 230 g. per 1 g. of complex former, so that the concentration of disinfectant substance in the agent can be decreased without diminishing its germ killing effect. This is particularly important in those cases where higher concentrations of the disinfectant substance could cause detrimental or undesired side effects to occur as in the case of body washing agents.

Various modifications of the compositions and method of the invention may be made without departing from the spirit or scope thereof, and it should be understood that the invention is to be limited only as defined in the appended claims.

We claim:
1. A compound of the formula

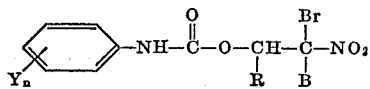

wherein Y is selected from the group consisting of chlorine and nitro, $n$ is 0.1 or 2, R is selected from the group consisting of hydrogen and methyl and B is selected from the group consisting of hydrogen, methyl, ethyl and

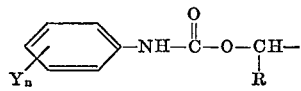

wherein R, Y and N have the above definitions.

2. A compound of claim 1 which is 2 bromo-2-nitroethyl-N-(3-chlorophenyl)-carbamate.
3. A compound of claim 1 which is 2-bromo-2-nitropropyl-N-(4-nitrophenyl)-carbamate.
4. A compound of claim 1 which is 2-bromo-2-nitrobutyl-N-phenylcarbamate.
5. A compound of claim 1 which is 2-bromo-2-nitrobutyl-N-(3,4-dichlorophenyl)-carbamate.
6. A compound of claim 1 which is 1-methyl-2-bromo-2-nitropropyl-N-(3-chlorophenyl)carbamate.
7. A compound of claim 1 which is 2-bromo-2-nitropropanediol-(1,3)-bis-N-phenylcarbamate.
8. A compound of claim 1 which is 2-bromo-2-nitropropanediol-(1,3)-bis-N-(3-chlorophenyl)-carbamate.
9. A compound of claim 1 which is 2-bromo-2-nitropropanediol - (1,3) - bis - N - (3,4-dichloro-phenyl)-carbamate.
10. A compound of claim 1 which is 2-bromo-2-nitropropanediol - (1,3) - bis - N - (4-nitrophenyl)-carbamate.

References Cited
UNITED STATES PATENTS 3,439,019   4/1969   Sanett et al. _____ 260—472

JAMES A. PATTON, Primary Examiner

L. A. THAXTON, Assistant Examiner

U.S. Cl. X.R.

424—300